July 14, 1925.  1,546,238
F. T. HORIUCHI
ATOMIZING APPARATUS
Filed Sept. 15, 1922  2 Sheets-Sheet 1
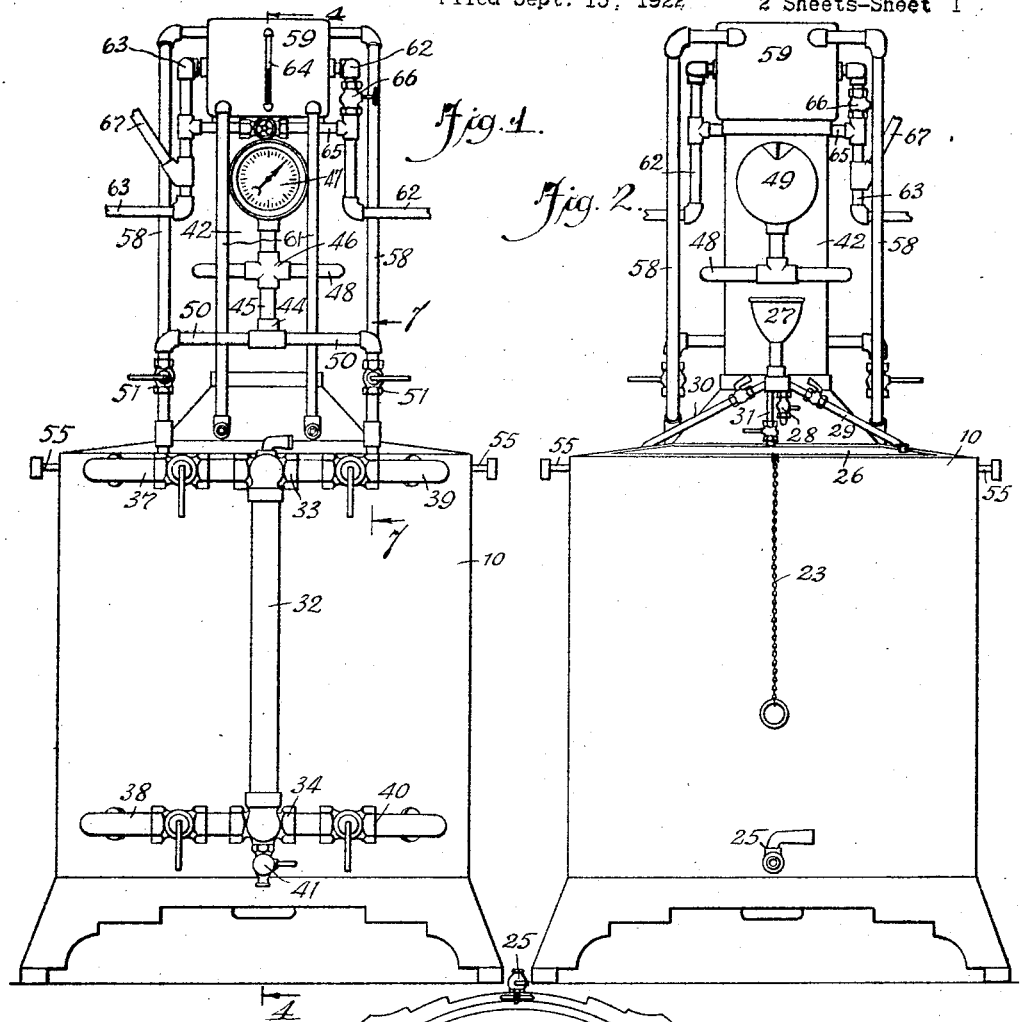

July 14, 1925.
F. T. HORIUCHI
ATOMIZING APPARATUS
Filed Sept. 15, 1922
1,546,238
2 Sheets-Sheet 2
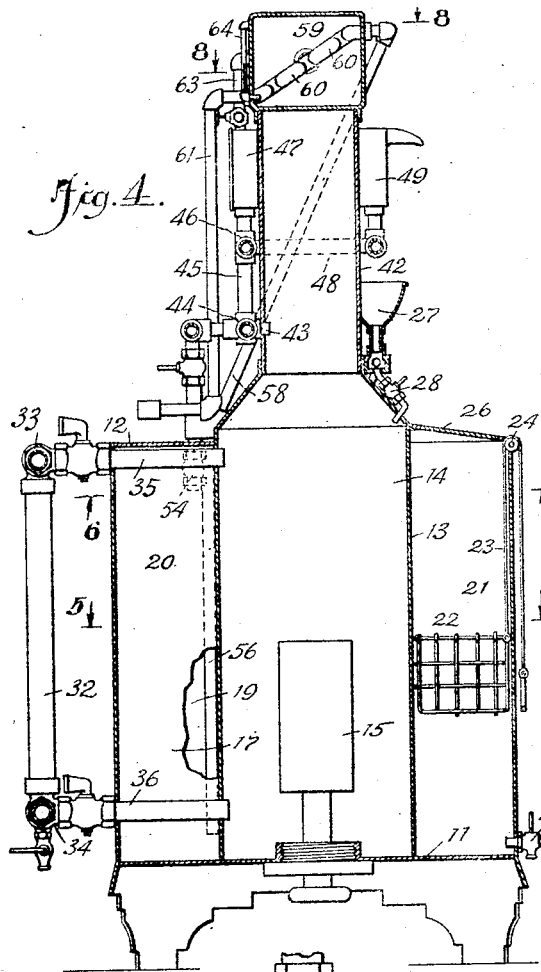
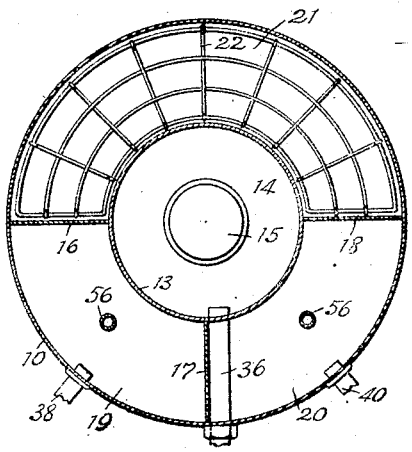
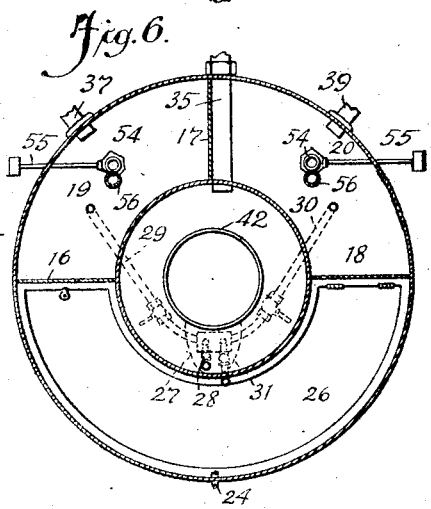
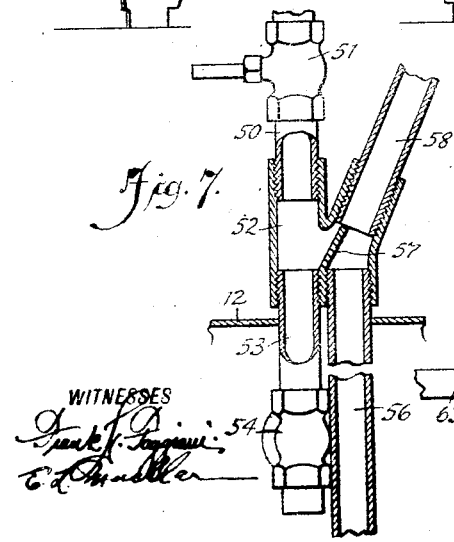
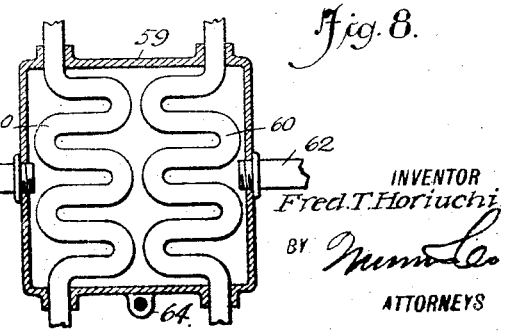
INVENTOR
Fred. T. Horiuchi
ATTORNEYS Patented July 14, 1925.

1,546,238

UNITED STATES PATENT OFFICE.

FRED T. HORIUCHI, OF NEW YORK, N. Y.

ATOMIZING APPARATUS.

Application filed September 15, 1922. Serial No. 588,453.

*To all whom it may concern:*

Be it known that I, FRED T. HORIUCHI, a subject of the Emperor of Japan, and a resident of the city of New York, borough of Manhattan, in the county and State of New York, have invented a new and Improved Atomizing Apparatus, of which the following is a full, clear, and exact description.

This invention relates to improvements in surgical appliances, and has particular reference to an atomizing apparatus.

An object of the invention is to provide an apparatus of the above character, wherein a medicated liquid is conveyed from a storage compartment, mixed with another fluid, such as steam, and the mixture thereafter brought to a desired temperature for use.

Another object is to control from a common source the operation of mixing a medicated liquid with steam and regulating the temperature of the mixture.

A further object is to provide a common inlet for the different compartments of the apparatus which may be controlled in such a manner that a liquid may be supplied to any one or more of the compartments in exclusion to the others.

A still further object is to permit of ascertaining the quantities of liquids in the various compartments of the apparatus by a means common to said compartments.

The above and other objects will appear more clearly from the following detail description when taken in connection with the accompanying drawings which illustrate a preferred embodiment of the inventive idea.

In the drawings—

Figure 1 is a front elevational view of the apparatus constructed in accordance with the invention;

Figure 2 is a rear elevation thereof;

Figure 3 is a fragmentary top plan view;

Figure 4 is a vertical longitudinal section on the line 4—4 of Figure 1;

Figure 5 is a transverse section on the line 5—5 of Figure 4, looking in the direction of the arrows;

Figure 6 is a similar view on the line 6—6 of Figure 4;

Figure 7 is an enlarged sectional view on the line 7—7 of Figure 1, showing the mixing chamber employed in connection with the invention; and Figure 8 is an enlarged section on the line 8—8 of Figure 4, illustrating the temperature regulating chamber employed.

The apparatus embodied in the present invention is primarily designed for use in treating the nose, mouth and ears, and is adapted to have various appliances which form no part of the present invention connected thereto when performing the different treatments.

The apparatus preferably comprises a substantially cylindrical tank, generally indicated by the numeral 10, having a base 11 and a top 12. A cylindrical inner wall 13 is provided centrally of the tank 10 to form a water heating compartment 14 and mounted within the base 11 and projecting into the compartment 14 is an electric water heater, conventionally illustrated by the numeral 15. Three vertically arranged partitions 16, 17 and 18 are disposed between the inner wall 13 and the outer wall of the tank 10 to provide the compartments 19, 20 and 21, the two first named compartments being designed to contain any desired medicated fluid, while the last named compartment is of substantially semi-circular formation in cross section and contains water which is heated through the inner wall 13 by the heater 15 for the purpose of sterilizing surgical instruments which are supported in a wire basket 22 suspended within the compartment 21 by means of a flexible connection 23 extending over a pulley 24 mounted in the top of the tank 10 so that the basket may be raised and lowered within the compartment. Adjacent the bottom of the compartment 21 a drain 25 is provided for emptying the water from said compartment whenever desired. The portion of the top 12 of the tank above the compartment 21 is provided with an opening, which is closed by means of a hinged door 26 when instruments are being sterilized in the basket 22, and which door may be opened when it is desired to remove the instruments from said basket.

Mounted upon the portion of the inner wall 13 extending above the top 12 is a liquid inlet 27, which is common to the compartments 14, 19, 20 and 21, so that any one or all of these compartments may be filled through this inlet. In order to accomplish this purpose the valved connections 28, 29, 30 and 31 are extended from the common inlet 27 to the respective compartments in the order named. By this construction it will be seen that should it be desired to fill the compartment 14 with water, the valve for the connection 28 may be opened and the valves of the remaining connections closed to exclude the water from the compartments 19, 20 and 21. In the same manner the compartments 14 and 21 may simultaneously be filled by opening the valves for the connections 28 and 31 and closing the valves for the connections 29 and 30. Likewise either or both of the compartments 19 and 20 may be filled with a medicated liquid by opening the valves for the connections extending to these compartments and closing the valves for the connections 28 and 31.

The invention further contemplates the provision of means for determining the quantity of liquids in the compartments 14, 19 and 20. To this end a gauge 32 is provided, which extends vertically of the front of the casing and is connected at its upper and lower ends to the unions 33 and 34. To establish communication between the gauge 32 and the compartment 14, the upper and lower valved connections 35 and 36 are provided, the inner ends of which project into the compartment 14, while the outer ends thereof are connected to the unions 33 and 34. Also extending from the unions 33 and 34 are valved connections 37 and 38, the inner ends of which project into the compartment 19. Similarly the valved connections 39 and 40 are extended from the unions 33 and 34 and communicate with the compartment 20. The lower union 34 is provided with a drain 41, whereby the liquid in the gauge 32 may be emptied therefrom. Thus when it is desired to ascertain the quantity of water in the compartment 14 the valves for the connections 35 and 36 are opened and the remaining valves closed, so that the water in the compartment 14 will flow into the gauge 32. In the same manner the quantities of medicated liquid in the compartments 19 and 20 may be determined by closing the valves for the connections 35 and 36, draining the gauge 32 and then opening the valves of the connections 37, 38 and 39, 40 respectively.

Centrally disposed upon the top 12 of the tank 10 and extending upwardly therefrom and in communication with the compartment 14, is a steam chamber 42 for receiving steam generated by the heated water in the compartment 14 and maintaining said steam under pressure for the purposes which will presently appear. The chamber 42 is provided adjacent its lower end with an outlet 43 having communication with a union 44 having an upwardly extending branch 45, the upper end of which is connected to a similar union 46. Communicating with the latter union is a steam gauge 47 of any desired construction which is utilized for determining the pressure of steam within the chamber 42. Also connected to the union 46 is a pipe 48 encircling the chamber 42 and having connection with a safety valve 49 of any conventional construction and disposed on the opposite side of the chamber 42 with respect to the steam gauge 47.

In order that the steam pressure within the chamber 42 may be utilized to eject a medicated liquid from the compartments 19 and 20, connections are established from the outlet 43 through the union 44 to each of said compartments. Inasmuch as these connections are similar in construction it is believed that a description of one will be sufficient for a clear understanding of the operation, and like numerals will be employed to indicate similar parts in this portion of the construction. Extending from the union 44 in opposite directions are the pipes 50, each of which is provided with a valve 51 for controlling the passage of steam under pressure through its associated connection and the lower end of the pipe 50 communicates with an upper inlet end of a coupling 52 positioned above the top 12 of the tank and having a lower outlet connection or pipe 53 which projects into the tank, as best illustrated in Figure 7. The pipe 53 is provided interiorly of the tank with a valve 54 controlled from the exterior of the tank by a valve stem 55 so that the pressure of steam may be entirely shut off from the compartment into which the pipe 53 extends. Also mounted within the medicated liquid compartment is an outlet pipe 56, the lower end of which terminates short of the bottom 11 of the tank, as shown in Figure 4, while the upper end projects through the top 12 of the tank and communicates with the coupling 52. Disposed between the pipes 53 and 56 is a baffle plate 57 bent at an angle with respect to the longitudinal axes of said pipes so as to deflect liquid rising through the pipe 56 into the upper outlet pipe 58, the lower end of which also communicates with the coupling 52. The pipe 58, together with the plate 57, forms a mixing chamber in which the medicated liquid rising in the pipe 56 is mixed with a portion of the fluid entering the coupling 52 from the pipe 50. The baffle plate 57 is so positioned with respect to the pipes 53, 56 and 58 as to permit a small amount of the steam passing upwardly into the mixing chamber and, at the same time, prevent the pressure of steam entering the upper end of the pipe 56, which would otherwise have the effect of hindering the rise of the medicated liquid in said pipe. It will thus be seen that when the valves 51 and 54 are opened, steam under pressure will flow through the pipe 53 into the medicated liquid compartment and by reason of the pressure of said steam the medicated liquid in said compartment will be forced upwardly through the pipe 56 into the coupling 52 and from thence upwardly into the outlet pipe 58 forming a part of the mixing chamber. It will also be apparent that a portion of the steam entering the coupling 52 from the pipe 50 will be deflected by the baffle plate 57 into the pipe 58 where it will mix with the medicated liquid from the pipe 56 and be carried in suspension with said liquid through the outlet pipe 58. If, for any reason it should be desired to stop the flow of medicated liquid from the compartment and simply pass steam under pressure into the mixing chamber, this may be done by closing the valve 54 and maintaining the valve 51 opened.

When it is desired to entirely stop the flow of both the steam and medicated liquid both of said valves are closed.

The invention further contemplates the provision of means for regulating the temperature of the mixed fluid. For this purpose use is preferably made of a temperature regulating chamber 59 mounted upon the upper end of the chamber 42 and forming a closure for said upper end. Positioned within the chamber 59 are a pair of coils 60 arranged diagonally in said chamber with respect to a horizontal plane extending therethrough. Each of the coils communicates at one end with the upper end of one of the pipes 58, while the other end of said coil is connected with a pipe 61 extending downwardly from the chamber 59 to a point adjacent the top of the tank 10. Suitable connections (not shown) may be provided for attaching various appliances to the lower ends of the pipes 61 for the purpose of treating the mouth, nose and ears. The chamber 59 further has communicating therewith the cold water inlet and outlet pipes 62 and 63, the inlet pipe 62 being designed for connection to any suitable source of supply whereby water may flow into the chamber 59 and circulate about the coils 60 to cool the medicated fluid passing through these coils should said fluid become too warm. A thermometer 64 of any conventional design is mounted exteriorly of the chamber 59 and communicates with the interior thereof so that the temperature existing in the chamber may be readily ascertained.

Means are further provided for draining the medicated fluid from the ears, mouth and nose after the treatment of these parts has been completed. For this purpose a valved by-pass connection 65 is provided which extends transversely between the water inlet and outlet pipes 62 and 63. If no other treatment is being performed when it is desired to effect the draining operation the valve 66 in the inlet pipe 62 may be closed, if desired, and the valve in the connection 65 opened so that the water will circulate through said connection and from thence into the outlet pipe 63. Communicating with the latter pipe at a point adjacent the junction thereof with the connection 65 is a drain pipe 67, the outer end of which is designed to have connected thereto the instrument or appliance which has been employed in performing a treatment. The passage of water through the connection 65 and the outlet pipe 63 then creates a suction in the pipe 67 which will be effective in draining the medicated fluid, which has been injected through the pipes 61, from the part treated.

What is claimed is:

1. In an atomizing apparatus, a tank having a medicated fluid containing compartment therein, a mixing chamber, a pipe discharging into the bottom of the mixing chamber at one side thereof and supplying medicated liquid to the chamber, an outlet pipe communicating with the upper portion of the mixing chamber and at an angle to the first-mentioned pipe, a gaseous fluid supply pipe connected to the upper portion of the mixing chamber, an exhaust pipe in line with the last-mentioned pipe and connected with the bottom of the mixing chamber, a valve in the exhaust pipe, and a baffle located in the mixing chamber between the medicated liquid supply pipe and the exhaust pipe and positioned at an angle so as to permit a portion of the gaseous fluid from its supply pipe to pass into the outlet pipe together with the medicated liquid in an atomized form.

2. In an atomizing apparatus, a tank having a medicated fluid containing compartment therein, a mixing chamber, a pipe discharging into the bottom of the mixing chamber at one side thereof and supplying medicated liquid to the chamber, an outlet pipe communicating with the upper portion of the mixing chamber and at an angle to the first-mentioned pipe, a gaseous fluid supply pipe connected to the upper portion of the mixing chamber, an exhaust pipe in line with the last-mentioned pipe and connected with the bottom of the mixing chamber, a valve in the exhaust pipe, a baffle located in the mixing chamber between the medicated liquid supply pipe and the exhaust pipe and positioned at an angle so as to permit a portion of the gaseous fluid from its supply pipe to pass into the outlet pipe together with the medicated liquid in an atomized form, and means for regulating the temperature of the mixed or atomized fluid after the same has passed into the outlet pipe.

FRED T. HORIUCHI.